United States Patent
Hwang

(10) Patent No.: US 6,501,791 B1
(45) Date of Patent: Dec. 31, 2002

(54) METHOD AND APPARATUS FOR ALLOCATING TONES TO A PLURALITY OF USERS IN A MULTI-TONE MODEM COMMUNICATIONS SYSTEM

(75) Inventor: Chien-Meen Hwang, San Jose, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/359,343

(22) Filed: Jul. 21, 1999

(51) Int. Cl.[7] .................................................. H04B 1/38
(52) U.S. Cl. ....................... 375/222; 375/295; 375/260; 375/316; 370/295; 370/437; 370/480; 370/482; 370/485; 370/468
(58) Field of Search ................................ 375/220, 222, 375/240.11, 295, 240, 260, 340; 370/281, 295, 338, 431, 437, 458, 478, 480, 482, 485, 468, 537

(56) References Cited

U.S. PATENT DOCUMENTS

| | | | | | |
|---|---|---|---|---|---|
| 5,608,725 | A | * | 3/1997 | Grube et al. ................. | 370/338 |
| 5,625,651 | A | * | 4/1997 | Cioffi ....................... | 340/825.2 |
| 5,673,290 | A | * | 9/1997 | Cioffi ......................... | 370/210 |
| 5,790,550 | A | * | 8/1998 | Peeters et al. ............... | 370/333 |
| 5,812,786 | A | * | 9/1998 | Seazholtz et al. ........... | 370/465 |
| 6,160,820 | A | * | 12/2000 | Isaksson et al. ............ | 370/294 |
| 6,219,377 | B1 | * | 4/2001 | Linz ............................ | 375/222 |
| 6,226,322 | B1 | * | 5/2001 | Mukherjee ................. | 333/28 R |
| 6,259,746 | B1 | * | 7/2001 | Levin et al. ................. | 370/468 |
| 6,307,839 | B1 | * | 10/2001 | Gerszberg et al. .......... | 370/230 |
| 6,324,184 | B1 | * | 11/2001 | Hou et al. ................... | 370/468 |

FOREIGN PATENT DOCUMENTS

| | | |
|---|---|---|
| GB | 2332603 | 6/1999 |
| WO | WO 9534149 | 12/1995 |
| WO | WO 9748197 | 12/1997 |
| WO | WO 9852312 | 11/1998 |
| WO | WO 9965218 | 12/1999 |

* cited by examiner

Primary Examiner—Jean Corrielus
Assistant Examiner—Khanh Tran
(74) Attorney, Agent, or Firm—Williams, Morgan & Amerson

(57) ABSTRACT

A communications system includes a first and second modem coupled together via a communications link. The first modem has at least two user devices coupled thereto, and modulates data generated by the user devices on a plurality of tone carriers for transmission to the second modem. The first modem determines the number of user devices coupled to it. Based upon the number of user devices determined, the first modem divides the plurality of tone carriers into a number of subsets corresponding to the number of user devices based upon a predetermined criterion. The first modem then allocates a subset of tone carriers to a respective user device. In one embodiment, the usage rate of each user device is determined, and the tone carriers are reallocated to different subsets as a function of the usage rate of each respective user device.

21 Claims, 5 Drawing Sheets

METHOD AND APPARATUS FOR ALLOCATING TONES TO A PLURALITY OF USERS IN A MULTI-TONE MODEM COMMUNICATIONS SYSTEM

BACKGROUND OF THE INVENTION

1. Field of the Invention

The present invention relates generally to modem communications, and, more particularly, to a method and apparatus for allocating tones to multiple end-users in a discrete multi-tone (DMT) modem communications system.

2. Description of the Related Art

The telecommunications industry has undergone explosive growth over the past several years. A significant contribution to this growth has been the high demand for modem communication services, such as the Internet, which extend beyond traditional voice communications. Conventional landline telephone networks, which offer "Plain Old Telephone Service" (POTS), currently provide these modem services by transmitting data over a voice channel. The landline telephone network reaches nearly every household and business throughout the world, and has proven to be a relatively inexpensive medium for data transmission. Although dedicated data transmission networks also exist to provide these modern services, they are considerably more expensive to use. In addition, these data networks are not readily accessible to the general public, at least compared to the accessibility of the landline telephone network. Accordingly, a substantial portion of the public relies heavily on the landline telephone network as a cheaper alternative for providing these services.

With the increasing popularity of these modem services, however, the landline telephone network has rapidly become inefficient in handling these services due to limited bandwidth constraints. Currently, the landline network's 56.6 kilobits per second (KBPS) data transfer rate is not fast enough to keep up with the increasing complexity of these services. In addition, projected demand for other services, such as video-on-demand, teleconferencing, interactive TV, etc. is likely to exacerbate the limited bandwidth problem.

To meet the demand for high-speed data communications, designers have sought innovative and cost-effective solutions that take advantage of the existing landline telephone network infrastructure. Of these solutions, the Digital Subscriber Line (DSL) technology, uses the existing landline network infrastructure of POTS for broadband communications, thus enabling an ordinary twisted pair to transmit video, television, and high-speed data.

DSL technology leaves the existing POTS service of the landline network undisturbed. Traditional analog voice band interfaces use the same frequency band (i.e., 0–4 kHz) for data transmission as for telephone service, thereby preventing concurrent voice and data use. Asymmetric Digital Subscriber Line (ADSL) technology, a popular version of DSL, operates at frequencies above the voice channels from 100 kHz to 1.1 MHz. Thus, a single ADSL line is capable of offering simultaneous channels for voice and data transmission. The ADSL standard is fully described in ANSI T1.413 Issue 2, entitled "Interface Between Networks and Customer Installation—Asymmetric Digital Subscriber Line (ADSL) Metallic Interface, Rev. R4, dated Jun. 6, 1998, the entire contents of which is incorporated herein by reference.

ADSL systems utilize digital signal processing (DSP) to increase throughput and signal quality through common copper telephone wire. ADSL systems provide a downstream data transfer rate from the ADSL Point-of-Presence (POP) to the subscriber location at speeds of about 6 Megabits per second (MBPS), which is more than one-hundred times faster than the conventional 56.6 KBPS transfer rate currently available through the landline network.

The technology employed in T1.413-type ADSL modems is discrete multi-tone (DMT). The standard defines 256 discrete tones, with each tone representing a carrier signal that can be modulated with a digital signal for transmitting data. The specific frequency for a given tone is 4.3125 kHz multiplied by the tone number. Tone 1 is reserved for the voice band and tones 2–7 are reserved for the guard bands. Data is not transmitted near the voice band to allow for simultaneous voice and data transmission on a single line. Thus, the guard bands aid in isolating the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all of the data tones 8–256 may be used for downstream data transmission, and the upstream data present on tones 8–32 could be detected using an echo cancellation technique, as is well established in the art. Because a larger number of tones are used for downstream communication than for upstream communication, the transfer is said to be asymmetric.

ADSL technology significantly boosts the data transfer rate of the landline telephone network to levels at least commensurate with, if not exceeding, the transfer rates of present data networks. Assuming all 256 tones are free of impairments, the data transfer rate defined by the ADSL standard is about 6 MBPS downstream and 640 KBPS upstream, significantly dwarfing today's data transfer rate standard on the landline telephone network.

Although ADSL technology dramatically increases the available bandwidth to a single user, the user generally does not require all of the additional bandwidth for his or her own purposes. As a result, a substantial portion of the additional bandwidth is not utilized. As such, the unused bandwidth is essentially a wasted resource.

The present invention is directed to overcoming, or at least reducing the effects of, one or more of the problems set forth above.

SUMMARY OF THE INVENTION

In one aspect of the present invention, a method is provided for allocating a plurality of tone carriers in a communications system. The communications system includes a first modem and second modem coupled via a communications link. The first and second modems modulate data on the plurality of tone carriers for transmitting data over the communications link. The method includes determining a number of user devices that are to be coupled to the first modem. The plurality of tone carriers are divided into a number of subsets in accordance with a predetermined criterion, where the number of subsets corresponds to the number of user devices determined. Each subset of the plurality of tone carriers is allocated to a respective one of the determined number of user devices.

In another aspect of the present invention, an apparatus is provided that includes a first and second modem adapted to modulate data on a plurality of tone carriers. A communications link couples the first and second modem together and transfers data therebetween. The apparatus further includes at least two user devices adapted to couple to the first modem. The first modem divides the plurality of tone carriers into at least two subsets in accordance with a predetermined criterion, and allocates each subset of tone carriers to a respective one of the at least two user devices.

BRIEF DESCRIPTION OF THE DRAWINGS

The invention may be best understood by reference to the following description taken in conjunction with the accompanying drawings, in which like reference numerals identify like elements, and in which.

Figure 1:
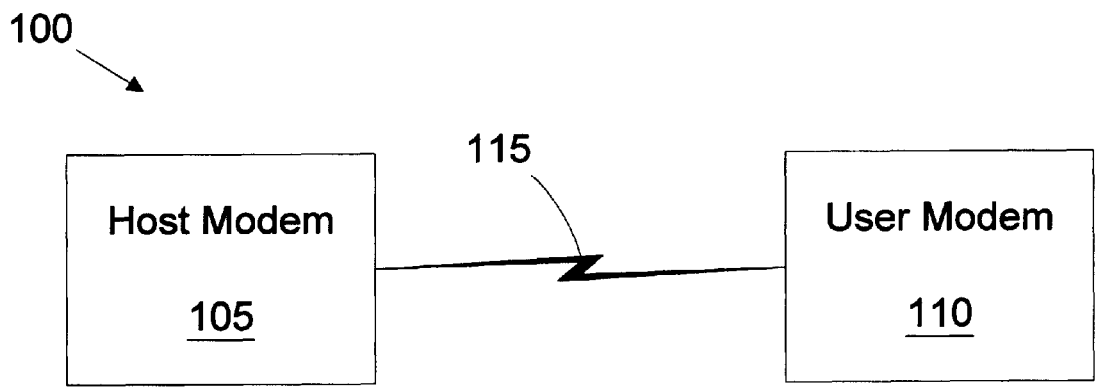
FIG. 1 is a block diagram of a communications system including a host and user modem in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a communications system 100 is shown in accordance with one embodiment of the present invention. The communications system 100 includes a host modem 105 coupled to a user modem 110 via a communications link 115. In the illustrated embodiment, the communications link 115 is an ordinary twisted pair connection, as is common in present day telephone networks. However, it will be appreciated that other types of known communications links could be used in lieu of the twisted pair connection (e.g., fiber, radio, etc.), if so desired, without departing from the spirit and scope of the present invention.

Figure 2:
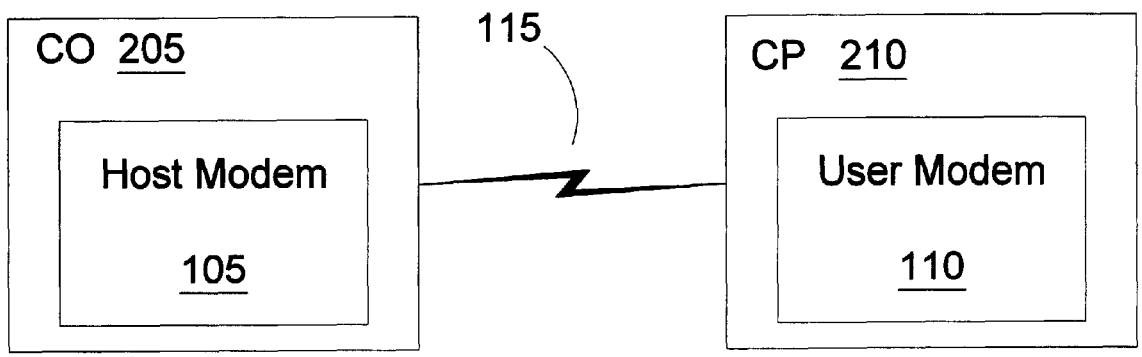
FIG. 2 shows the host and user modems of FIG. 1 installed within a central office and customer premise, respectively.

In accordance with one embodiment, the host modem 105 is located in a central office (CO) 205 of a telephone service provider as shown in FIG. 2. The user modem 110 is located in a customer premise (CP) 210, which could include a home, business, or the like. Typically, the host modem 105 will couple the user modem 110 to another service provider through the CO 205. If an individual at the CP 210 desires Internet service, for example, a connection is typically made between the user modem 110 and an Internet Service Provider (ISP) (not shown) via the host modem 105 at the CO 205. The modem 110 also provides the user with the capability of connecting with many other types of services in addition to Internet services.

In the illustrated embodiment, the host and user modems 105, 110 are DMT ADSL modems, where the host modem 105 generates the tones necessary for compatibility with the user modem 110. The host and user modems 105, 110 communicate with each other using a certain number of these tones for data transmission. Typically, the host modem 105 uses a larger number of tones for transmitting data (i.e., downstream tones) and fewer tones for receiving data (i.e., upstream tones). Conversely, the user modem 110 typically uses more tones for receiving data and fewer tones for transmitting data.

Although the host and user modems 105, 110 typically have the capability of using all of the 256 allocated tones, they generally use only a portion of these tones for typical data transmissions. This usually results since most applications performed at the CP 210 do not require the entire 6 MBPS capacity that is generally offered by the ADSL DMT modems 105, 110. The full 6 MBPS capacity typically depends, of course, on the quality (or clarity) of the communication channel, and that all 256 tones are usable, i.e., free of impairments. The host and user modems 105, 110 may also include "half-rate" or "quarter-rate" modems, wherein the number of available tones consists of 128 or 64 tones, respectively, allocated to the modems 105, 110. The maximum capacity of the half-rate and quarter-rate modems is approximately 3 MBPS and 1.5 MBPS, respectively.

Figure 3:
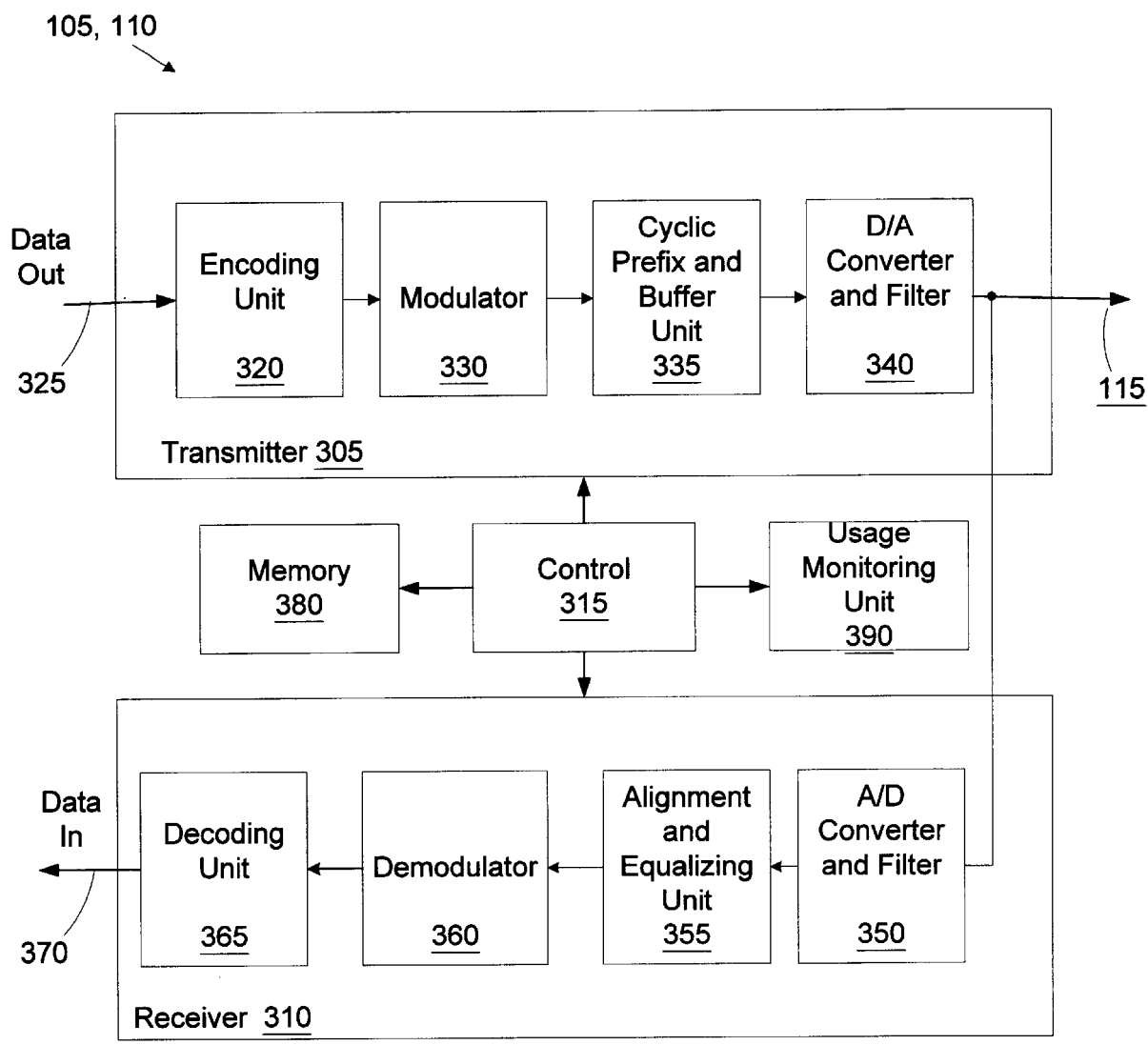
FIG. 3 is a block diagram of the host and user modems of FIG. 1 in accordance with one embodiment of the present invention.

Turning now to FIG. 3, a simplified block diagram of the host and user modems 105, 110 is shown in accordance with one embodiment. For clarity and ease of illustration, not all functional blocks are illustrated in detail since they are known to those of ordinary skill in the art, and are further defined in documents such as the aforementioned ANSI T1.413 Issue 2 standard. The host and user modems 105, 110 each include a transmitter 305 and a receiver 310 to respectively transmit and receive data with an "interfacing" modem (not shown). The interfacing modem could be either the host or the user modem 105, 110. The transmitter 305 includes an encoding unit 320 that receives outgoing digital data over a data-out line 325. The outgoing digital data may be received from a user device coupled to the modem 105, 110, such as a computer (not shown), which generates the data. The encoding unit 320 performs functions such as cyclic redundancy checking (CRC), scrambling, forward error correction, and interleaving according to methods well known to those of ordinary skill in the art. Such methods are further disclosed in the aforementioned ANSI T1.413 Issue 2 standard.

The data in the transmitter 305 is grouped into frames with a plurality of these frames, which number 68 in the illustrated embodiment, forming a superframe. The transmitter 305 further includes a modulator 330 that modulates tone carriers with the transmitted data. The modulator 330 performs tone ordering, constellation encoding, gain scaling, and inverse discrete Fourier transform (IDFT) functions to provide time domain waveform samples. The set of time domain waveform samples corresponding to a frame of data forms a symbol, which is transmitted over the communications link 115 to the interfacing modem (not shown).

A cyclic prefix and buffer unit 335 inserts a cyclic prefix to the output of the modulator 330 (i. e., a portion of the output samples from the modulator 330 is replicated and appended to the existing output samples to provide an overlap and permit better symbol alignment). The cyclic prefix and buffer unit 335 also buffers the output samples prior to sending these samples to a digital-to-analog (D/A) converter and filter 340. The D/A converter and filter 340 converts the digital output samples from the cyclic prefix and buffer unit 335 to an analog waveform suitable for transmission over the communications link 115. As previously discussed, the communications link 115 consists of an ordinary twisted pair in the illustrated embodiment, thereby forming an analog phone connection between the host and user modems 105, 110. As mentioned, the communications link 115 may optionally include some other type of communications medium in lieu of the twisted pair connection, if so desired. Of course, the data may require additional processing in the transmitter and receiver 305, 310, depending on the type of communications medium used for the link 115.

The receiver 310 includes an analog-to-digital (A/D) converter and filter 350 that receives an analog waveform over the analog phone communications link 115, and samples the analog waveform to generate a time domain digital signal. An alignment and equalizing unit 355 performs symbol alignment and time domain equalization as is well established in the art. In time domain equalization, since the tones are at different frequencies, certain frequencies travel faster than others, and, as such, the tones may not arrive at the same time. The time domain equalization function will shorten the impulse response of the channel. The cyclic prefix insertion performed by either the host or user modem 105, 110 improves symbol alignment accuracy. The alignment and equalizing unit 355 also performs gain control to increase the amplitude of the received signal.

A demodulator 360 receives the time domain samples from the alignment and equalizing unit 355 and converts the time domain data to frequency domain data to recover the tones. The demodulator 360 further includes a frequency domain equalizer to compensate for channel distortion. The demodulator 360 then performs a slicing function to determine constellation points from the constellation encoded data, a demapping function to map the identified constellation point back to bits, and a decoding function (e.g., Viterbi decoding, if trellis constellation coding is employed). The demodulator 360 also performs tone deordering to reassemble the serial bytes that were divided among the available tones. A decoding unit 365 performs forward error correction, CRC checking, and descrambling functions on the data received from the demodulator 360, also using methods well known to those of ordinary skill in the art. The reconstructed data provided by the decoding unit 365 represents the sequential binary data that was sent by the interfacing modem (not shown). The reconstructed data is provided to a data-in line 370 for sending the digital data to a device coupled to the modems 105, 110 such as a computer, for example.

The host and user modems 105, 110 illustrated in FIG. 3 further include a control unit 315 for controlling the transmitter and receiver 305 and 310. The control unit 315 has associated therewith a memory 380 for storing instruction sets, thereby enabling the control unit 315 to control the transmitter and receiver 305, 310 in accordance with the stored instruction sets. Alternatively, the instruction sets may be provided by a device (not shown) coupled to the modem 105, 110 in lieu of or in addition to the memory 380.

Through a training procedure, the respective control units 315 of the modems 105, 110 sense and analyze which tones are clear of impairments in the telephone line. Each tone that is deemed to be clear is used to carry information. Accordingly, the maximum data transfer capacity is set by the quality of the telephone communications link 115.

Figure 4:
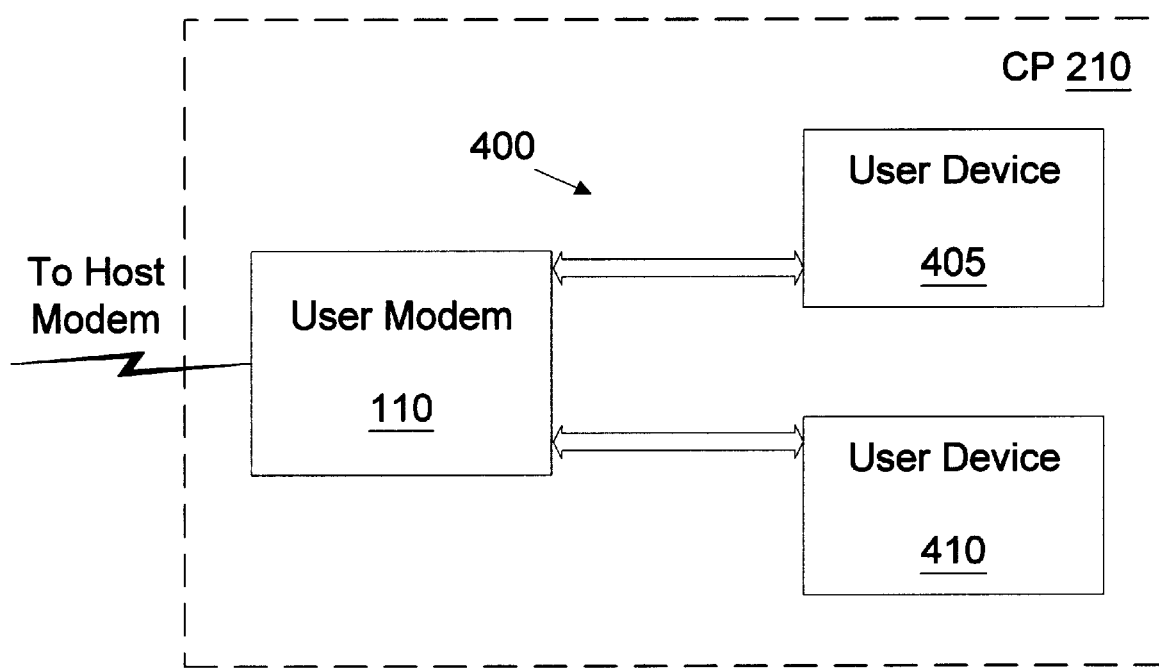
FIG. 4 illustrates a user installation of the user modem of FIG. 1 in accordance with one embodiment of the present invention.

Turning now to FIG. 4, a block diagram of a user installation 400 at the CP 210 is shown in accordance with one embodiment. The user modem 110 is coupled to one or more user devices 405, 410. In this particular embodiment, the user devices 405, 410 are personal computers (PC) available from a variety of manufacturers, such as Compaq Computer Corp., for example, which could include a desktop computer, notebook computer, or the like. Alternatively, a minicomputer or other type of computer system, which is typically used in commercial applications, could be used in lieu of the PC without departing from the spirit and scope of the present invention. Although two user devices 405, 410 are shown coupled to the modem 110 in FIG. 4, any desired number of user devices 405, 410 could couple to the modem 110. Of course, the modem 110 can only provide a certain amount of bandwidth to adequately support a maximum number of user devices 405, 410.

Figure 5:
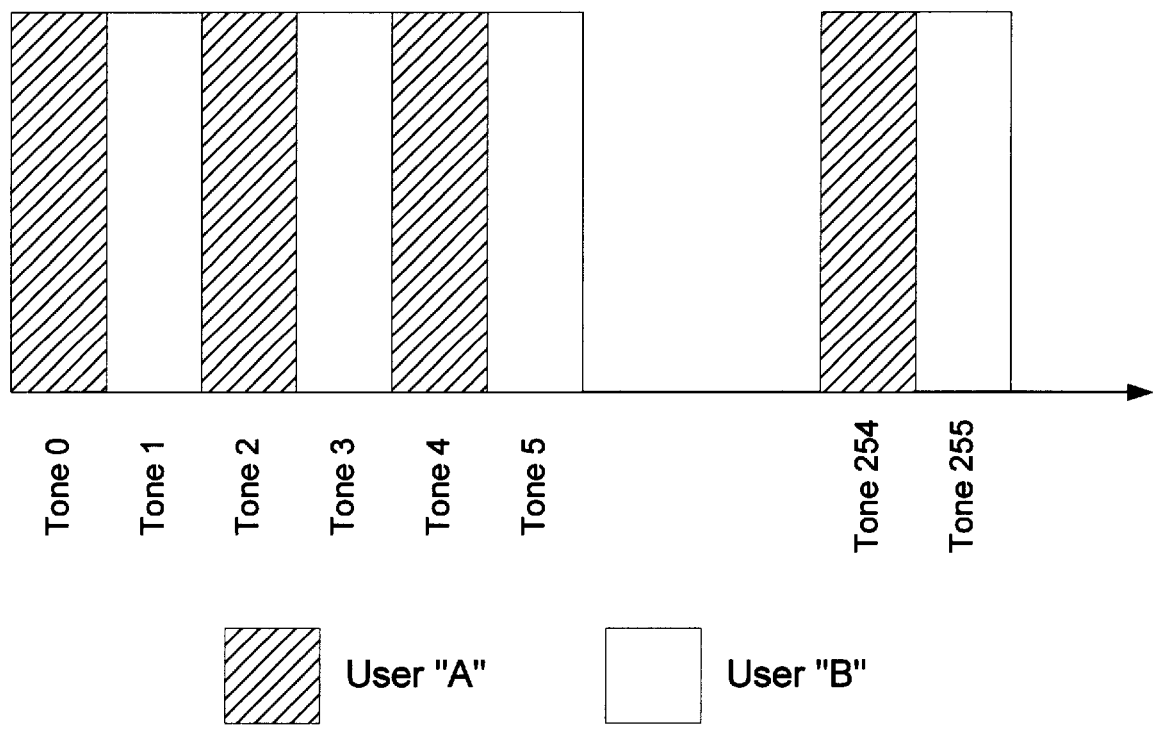
FIG. 5 shows a particular allocation of tones to multiple user devices in accordance with one embodiment.

The data transfer between the host modem 105 and the user modem 110, as previously mentioned, could have a maximum capacity of 6 MBPS for downstream transmission provided that all 256 tones are free of impairments. However, an individual at the CP 210 will rarely, if at all, use the entire bandwidth allocated to the user modem 110 for most applications performed at the CP 210. Thus, in accordance with the present invention, the full set of 256 tones originally allocated to a single user of the user modem 110 is split among multiple users by the control unit 315. In accordance with one embodiment, the 256 tones are split between two users of the user modem 110, such that one user is allocated a group of tones corresponding to the "even" numbered tones (i.e., tones 0, 2, 4, 6, etc.), and the other user is allocated a group of tones corresponding to the odd numbered tones (i.e., 1, 3, 5, 7, etc.). This particular configuration is shown in FIG. 5, where the "even" tones (designated as the "shaded" tones) are allocated to one user "A," and the "odd" tones (i e., the "unshaded" tones) are assigned to the other user "B." User "A" could be assigned to user device 405 and user "B" could be assigned to user device 410, for example, as shown in FIG. 4. In this particular embodiment, the even and odd tones would respectively be allocated to the user devices 405, 410. In accordance with one embodiment, the tone reallocation (i.e., odd/even designation) applies to tones used for data transmission and not to pilot tones, for example, or other such tones for control signaling purposes. Accordingly, pilot tones are not reallocated in this particular embodiment.

It will be appreciated that the 256 tones could be divided between the two users in some other fashion as opposed to the aforementioned odd/even designation. For example, the tone allocation could be to assign the first two tones (i.e., tones 0, 1) to the user device 405, and the second two tones (i.e., tones 2, 3) to the user device 410, and so on until all 256 tones are allocated. It will be appreciated, that many other arrangements of tone groupings could be allocated between the two user devices 405, 410, and, thus, need not be limited to the aforementioned examples. As previously discussed, it will be appreciated that more than two user devices 405, 410 could be assigned to a single user modem 110, and allocated their own unique group of tones. The specific number of user devices 405, 410 that are to be added to the modem 110 could be predetermined or, alternatively, could be determined by the number of user devices 405, 410 that desire to access the modem 110. For example, five user devices 405, 410 could be physically coupled to the modem 110, however, only three user devices 405, 410 may desire simultaneous access to the user modem 110. As more user devices 405, 410 are added to a single user modem 110, the total amount of bandwidth allocated to each individual user device 405, 410 that is coupled to the modem 110 decrease. Accordingly, a "user threshold" could be employed to limit the number of user devices 405, 410 desiring to utilize the modem 110 simultaneously.

The control unit 315, as shown in FIG. 3, allocates the group of tones to the multiple user devices 405, 410 of the modem 110 according to instruction sets stored within the memory 380. Accordingly, changing the instruction sets within the memory 380 can alter the number of users allocated to a particular user modem 110. Additionally, changing the instruction sets within the memory 380 could also alter the particular grouping of tones (e.g., odd/even groupings, etc.) to a specific user device 405, 410. In accordance with another embodiment, the instruction sets could be stored individually within the respective memories (not shown) of the user devices 405, 410 either in lieu of, or in addition to, the memory 380 of the modem 110.

In an alternative embodiment, the number of user devices 405, 410 assigned to a particular user modem 110, and the grouping of tones assigned to each user device 405, 410, could be dynamically reallocated. The control unit 315 could perform such dynamic reallocation by determining the user load and/or a particular user's usage rate. Thus, if the computing requirements of a particular user changes, the user's respective tone allocation can be dynamically altered accordingly to compensate for such change in his/her computing requirements. For example, if an individual requires additional bandwidth to accomplish more complex applications, the number of tones allocated to the user device 405, 410 requiring additional bandwidth could be increased. Similarly, the number of tones for other users may be decreased if they do not require (i.e., fully utilize) their current bandwidth allocation. Such determination of the user's usage rate may be determined by a usage monitoring unit 390 deployed within the modem 110. The specific process by which the usage monitoring unit 390 may determine a particular user's usage rate is fully disclosed in U.S. patent application Ser. No. 09/260,252; entitled "Transceiver With Usage-Based Rate Adaptation", by Terry L. Cole, filed Mar. 2, 1999, and commonly assigned with the present application, the entire contents of which is incorporated herein by reference.

Figure 6:
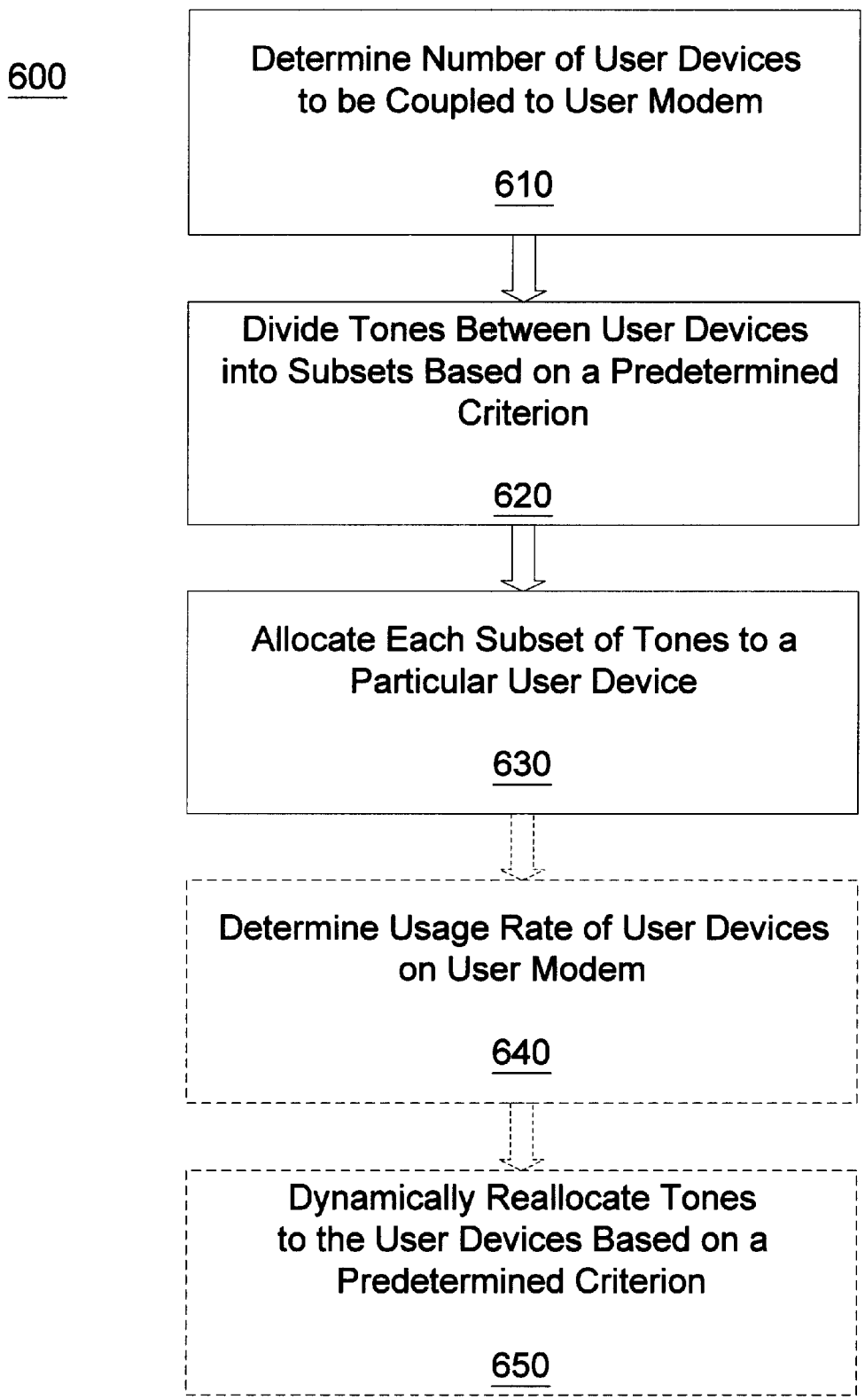
FIG. 6 shows a process for allocating tones to multiple user devices according to one embodiment of the present invention.

Turning now to FIG. 6, a process 600 for allocating tones to multiple users of the ADSL DMT modem 110 is shown. The process 600 commences at step 610, where the number of user devices 405, 410 that are to be assigned to a particular modem 110 is determined. In one embodiment, the number of user devices 405, 410 assigned to the user modem 110 could be determined by the number of user devices 405, 410 requesting the modem 110. Further, the number of user devices 405, 410 could be restricted such that only a maximum number of user devices 405, 410 could access the modem 110 simultaneously. Alternatively, the number of user devices 405, 410 having access to the modem 110 could be "fixed," and defined by the instruction sets stored within the memory 380, as previously discussed.

Subsequent to determining the number of user devices 405, 410 to be serviced by the user modem 110, the process 600 proceeds to step 620, where the tones allocated to the user modem 110 are divided into groups based on a predetermined criterion. For example, if there are two user devices 405, 410, the predetermined criterion may be to allocate one user device 405 the even tones and the other user device 410 the odd tones, as previously discussed. If there are three user devices 405, 410 to be assigned to the user modem 110, the predetermined criterion may be to allocate every third tone to each respective user device 405, 410 (i.e., the first user device tones 0, 3, 6, 9, etc.; the second user device tones 1, 4, 7, 10, etc.; the third user device tones 2, 5, 8, 11, etc.). At step 630, the control unit 315 allocates each particular group of tones to the respective user device 405, 410.

In accordance with another embodiment, the process 600 could continue to a step 640, where the control unit 315 monitors the usage rate of each respective user device 405, 410 on the user modem 110. This is accomplished using the methodology as described in the aforementioned patent application Ser. No. 09/260,252. Depending on the user's usage rates determined at step 640, the tones previously allocated to the respective user devices 405, 410 could be dynamically reallocated at step 650. For example, if the user device 405 is using considerably more bandwidth than the user device 410, a certain number of the tones previously allocated to the user device 410 could be reallocated to the user device 405.

The tone allocation procedure as described above provides for greater flexibility by adding additional user devices 405, 410 to a particular user modem 110, thereby fully utilizing the available bandwidth that would otherwise not be used. By dynamically altering the tone allocation of a particular user device 405, 410, the user modem 110 is able to compensate for changes in a particular user's computing requirements, thus efficiently utilizing all of the available bandwidth allocated to the user modem 110.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for allocating a plurality of tone carriers in a communications system, the communications system including a first modem and second modem coupled via a communications link, the first and second modems modulating data on the plurality of tone carriers for transmitting data over the communications link, the method comprising:

determining a number of user devices that are to be coupled to the first modem;

dividing the plurality of tone carriers into a number of subsets in accordance with a predetermined criterion, the number of subsets corresponding to said number of user devices determined; and allocating each subset of the plurality of tone carriers to a respective one of said determined number of user devices.

2. The method of claim 1, wherein said determining, further comprises:

determining the number of user devices that desire to access the first modem.

3. The method of claim 1, wherein said determining, further comprises:

determining the number of user devices that are physically coupled to the first modem.

4. The method of claim 1, further comprising:

determining a usage rate for each respective user device.

5. The method of claim 4, further comprising:

dynamically reallocating the plurality of tone carriers among said number of subsets as a function of said determined usage rates.

6. The method of claim 5, wherein said dynamically reallocating, further comprises:

dynamically reallocating tone carriers from a subset associated with a user device having a lower usage rate to a subset associated with a user device having a higher usage rate.

7. The method of claim 1, wherein said determining further comprises:

determining that a first user device and a second user device are coupled to said first modem.

8. The method of claim 7, wherein said dividing the plurality of tone carriers into a number of subsets based upon a predetermined criterion further comprises:

dividing the tone carriers into a first subset including even numbered tone carriers and a second subset including odd numbered tone carriers.

9. The method of claim 8, wherein said allocating further comprises:

allocating said first subset of tone carriers to said first user device and said second subset of tone carriers to said second user device.

10. An apparatus, comprising:

a first and second modem adapted to modulate data on a plurality of tone carriers; and a communications link adapted to couple the first and second modem together and to transfer the data therebetween;

wherein the first modem is further adapted to determine a number of user devices coupled thereto; divide the plurality of tone carriers into a number of subsets in accordance with a predetermined criterion; and allocate each subset of tone carriers to a respective one of said determined number of devices.

11. The apparatus of claim 10, wherein the first modem is further adapted to determine the number of user devices that desire to access the first modem.

12. The apparatus of claim 10, wherein the first modem is further adapted to determine a usage rate for each respective user device coupled thereto.

13. The apparatus of claim 12, wherein the first modem is further adapted to dynamically reallocate the plurality of tone carriers among said number of subsets as a function of said determined usage rates.

14. The apparatus of claim 13, wherein the first modem is further adapted to dynamically reallocate tone carriers from a subset associated with a user device having a lower usage rate to a subset associated with a user device having a higher usage rate.

15. The apparatus of claim 14, wherein a first and second user device is coupled to the first modem, and wherein the first modem divides the tone carriers into a first subset of even-numbered tone carriers and a second subset of odd-numbered tone carriers and allocates said first subset to said first user device and said second subset to said second user device.

16. The apparatus of claim 10, wherein the first and second modems include ADSL DMT modems.

17. The apparatus of claim 10, wherein the user devices include personal computers.

18. The apparatus of claim 10, wherein the communications link includes a telephone line.

19. The apparatus of claim 10, wherein the first modem is located at a customer premise and the second modem is located at a central office.

20. An apparatus, comprising:

a first and second modem adapted to modulate data on a plurality of tone carriers;

a communications link adapted to couple the first and second modem together and to transfer the data therebetween; and at least two user devices adapted to couple to said first modem;

wherein the first modem is further adapted to divide the plurality of tone carriers into a number of subsets in accordance with a predetermined criterion; and to allocate each subset of tone carriers to a respective one of said at least two user devices.

21. A modem adapted to modulate data on a plurality of tone carriers, the modem coupled to at least two user devices, the modem comprising:

a memory adapted to store instruction sets;

a control unit adapted to, in accordance with said instruction sets, divide the plurality of tone carriers into a number of subsets in accordance with a predetermined criterion; and to allocate each subset of tone carriers to a respective one of said at least two user devices.

* * * * *